United States Patent [19]

Takahashi et al.

[11] Patent Number: 4,674,001
[45] Date of Patent: Jun. 16, 1987

[54] CAM DRIVEN MODE SELECTION MECHANISM FOR TAPE RECORDER

[75] Inventors: Akira Takahashi, Nagoya; Isao Hasegawa, Saitama, both of Japan

[73] Assignees: Clarion Co., Ltd., Tokyo; Zero Engineering Ltd., Nagoya, both of Japan

[21] Appl. No.: 594,092

[22] Filed: Mar. 28, 1984

[30] Foreign Application Priority Data

Mar. 31, 1983 [JP] Japan .............................. 58-49157[U]

[51] Int. Cl.⁴ .......................... G11B 5/54; G11B 15/02
[52] U.S. Cl. .................................. 360/137; 360/96.2; 360/96.4; 360/105
[58] Field of Search ................... 360/137, 96.2, 96.4, 360/105

[56] References Cited

U.S. PATENT DOCUMENTS

| 4,225,894 | 9/1930 | Fulukawa et al. | 360/137 |
| 4,394,697 | 7/1983 | Kurosawa | 360/137 |
| 4,403,265 | 9/1983 | Okada et al. | 360/96.5 |
| 4,430,680 | 2/1984 | Yamaguchi et al. | 360/96.2 |
| 4,495,535 | 1/1985 | Kohri et al. | 360/137 |

Primary Examiner—Robert S. Tupper
Attorney, Agent, or Firm—Flynn, Thiel, Boutell & Tanis

[57] ABSTRACT

The mode selection mechanism in a magnetic tape recording and reproducing apparatus is adapted to move a mode plate and a forward/reverse changeover plate to given positions in response to a mode selecting manual operation and to thereafter move a power plate by a predetermined stroke in a direction prependicular to the movements of the mode plate and of the changeover plate, thereby creating any desired tape feeding mode. The mode plate and the changeover plate are independently moved by rotations of a mode cam which is intermittently moved by a tape drive motor through a power transmission means. The power plate is moved by rotation of a power cam which is moved by the same motor and may be interrupted by a power transmission means after the power cam makes a predetermined angular rotation.

16 Claims, 13 Drawing Figures 4,674,001

CAM DRIVEN MODE SELECTION MECHANISM FOR TAPE RECORDER

FIELD OF THE INVENTION

This invention relates to a cassette tape recording and reproducing apparatus including an auto-reverse mechanism for use in a vehicle, and more particularly to an improvement of a mode selection mechanism to select a tape feeding mode of the tape player such as fast forwarding, cue signal detection in fast forwarding mode, rewinding, cue signal detection in rewinding mode, playback and reverse-drive playback.

BACKGROUND OF THE INVENTION

A prior art mechanism is adapted to effect such a mode selection through a combination of an electric signal generated by a manual mode selecting operation and a series of mechanical actuations in response to the electric signal. Therefore, it is necessary to use a large number of motors and solenoids to convert the electric signal into the desired mechanical actuations. Also, the interconnection between gears and link members to create such desired cooperative mechanical actuation is extremely complicated.

OBJECT OF THE INVENTION

It is therefore an object of the invention to provide a mode selection mechanism capable of selecting tape feeding modes and creating a proper mechanical actuation in response to the selected mode, but using only a single motor and two solenoids, thereby reducing the size and production cost of the tape player.

SUMMARY OF THE INVENTION

In accordance with the invention, there is provided a mode selection mechanism in a magnetic recording and reproducing apparatus which comprises:
- a changeover plate movable in a first direction to change the tape feeding direction of the magnetic recording and reproducing apparatus from the forward-drive to the reverse-drive, or vice versa;
- a mode plate movable in said first direction to select operation modes of said magnetic recording and reproducing apparatus;
- a mode cam rotated by a motor which is inherently mounted in said magnetic recording and reproducing apparatus to drive a tape;
- first means to selectively transmit rotation of said mode to said motor cam;
- second means responsive to said mode cam to move said changeover plate and said mode plate to positions corresponding to a mode selected by a manual mode selecting operation;
- a power plate slidable in a second direction different from said first direction;
- a power cam rotated by said motor;
- third means for interrupting the power transmission from said motor to said power cam after the power cam rotates by a predetermined angle; and
- fourth means responsive to said power cam to move said power plate together with said mode plate by a predetermined stroke.

The invention will be better understood from the description hereinbelow given, referring to a preferred embodiment illustrated in the accompanying drawings.

DETAILED DESCRIPTION OF THE PREFERRED EMBODIMENTS

Figure 1:
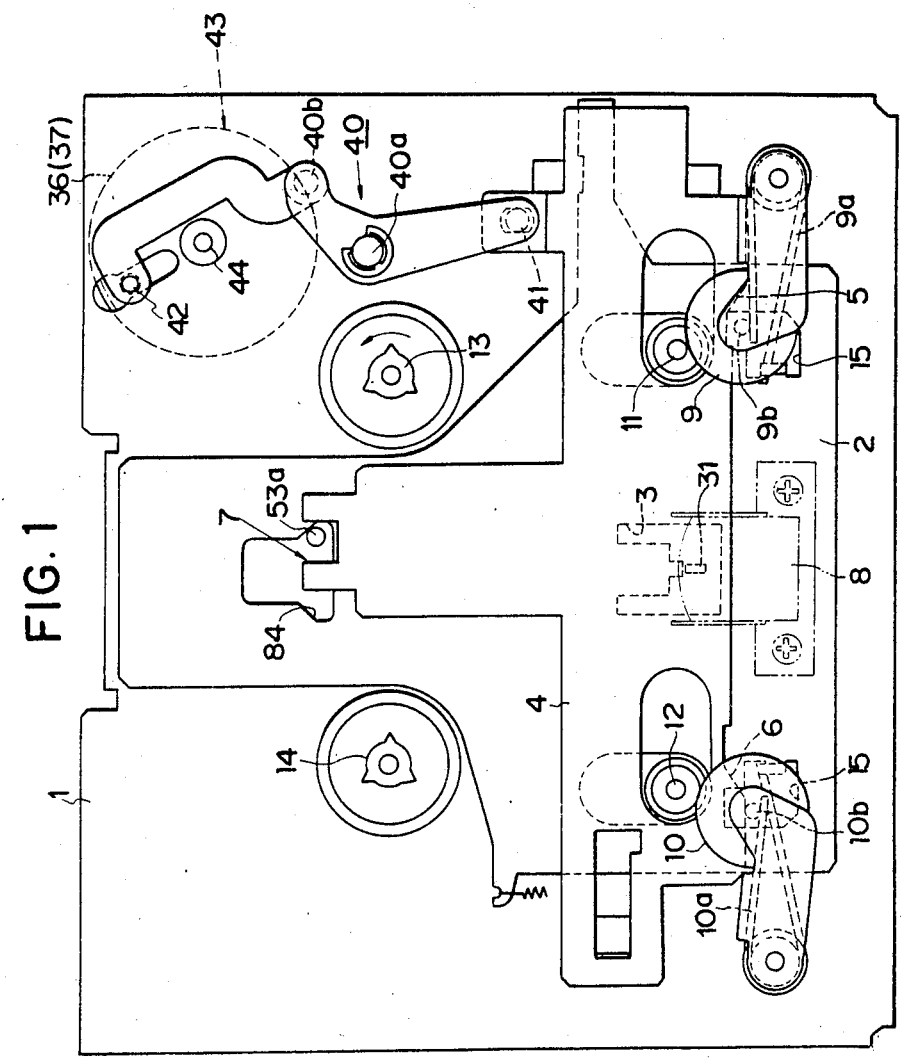
FIG. 1 is a plan view showing a tape reproducing apparatus embodying the invention.
Figure 2:
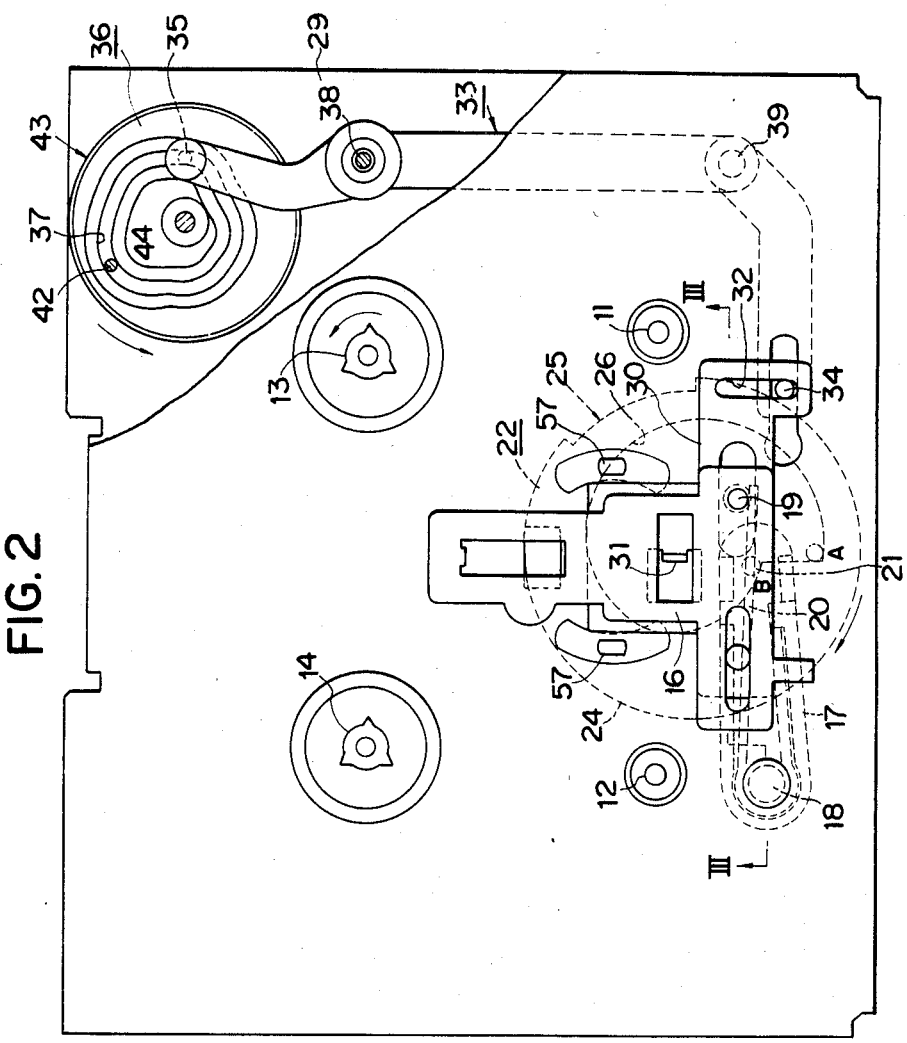
FIG. 2 is a plan view as seen from the same direction as FIG. 1 to particularly show a mode plate and a power plate.
Figure 6:
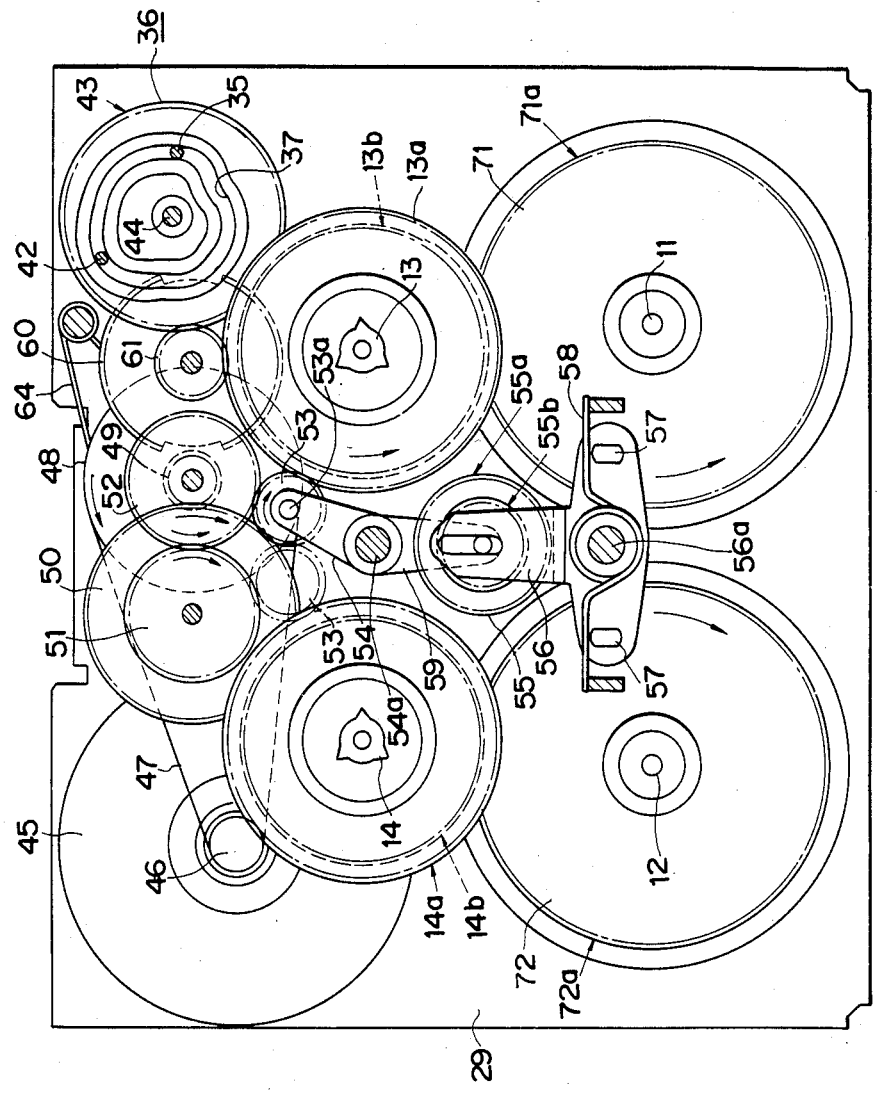
FIG. 6 is a plan view illustrating a series of gears disposed under a chassis.

In FIGS. 1, 2 and 6, it should be understood that the tape player is disposed with the front face thereof at the bottom of the Figures and with the rear face thereof at the top of the Figures. In contrast, in FIGS. 7 and 11 through 13, the front face comes at the top of the Figures and the back face at the bottom of the Figures.

Figure 3:
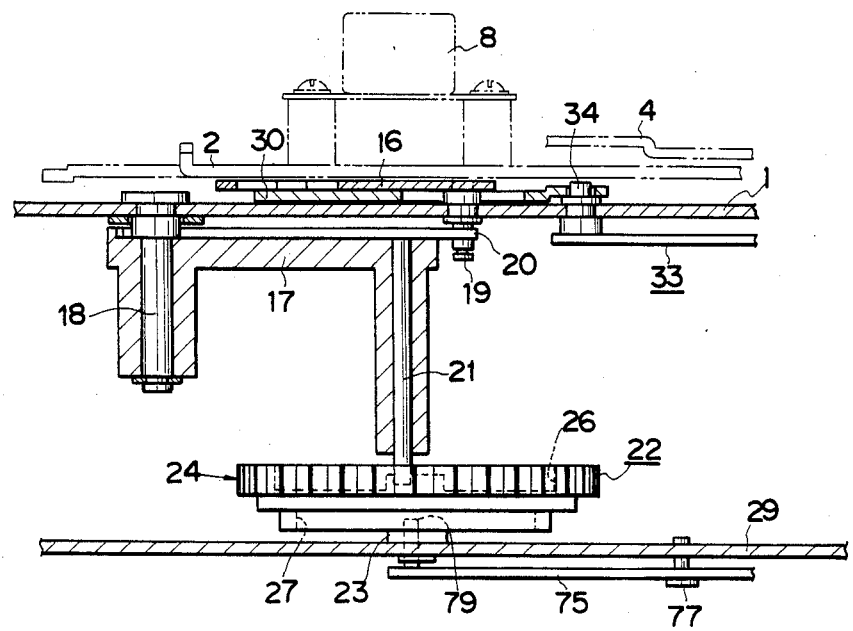
FIG. 3 is a cross-sectional view as sectioned along the line III—III of FIG. 2.
Figure 4:
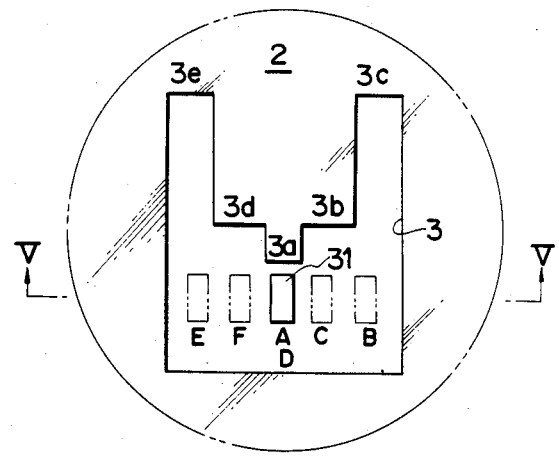
FIG. 4 is an enlargement of a cam hole of a head plate which engages a projection of the mode plate.

In FIGS. 1 through 3, reference numeral 1 designates a chassis, 2 is a head plate, and 4 is a changeover plate for changing the tape feeding direction from forward-drive to reverse-drive or vice versa. The head plate 2 is movable back and forth on the chassis 1 (up and down in FIG. 1). In these Figures, the head plate 2 is in the rearmost position. The head plate 2 carries thereon a playback head 8, and has therein a cam hole 3 as shown in FIG. 4 which plays an important role in cooperation with a projection 31 of a mode plate 30 which will be described later.

The changeover plate 4 is laterally slidable on the head plate 2 (to the left and right in FIG. 1). In the Figures, the plate 4 is in the rightmost position. Forward-drive and reverse-drive pinch rollers 9 and 10 are movably supported on the chassis 1 and are biased toward associated capstans 11 and 12 by springs 9a and 10a which act on shafts 9b and 10b of the pinch rollers. Displacement of the shafts 9b and 10b due to the energy of the springs 9a and 10a is regulated not only by edges of holes 15 in the head plate 2 but also by a pair of cam faces 5 and 6 formed along the front edge of the changeover plate 4. More specifically, when the head plate 2 is at the rearmost position and the changeover plate 4 is at the rightmost position as illustrated, the shaft 9b of the forward-drive pinch roller 9 is not disturbed by the head plate 2 nor by the cam face 5 of the changeover plate 4. The forward-drive pinch roller 9 forcibly contacts the capstan 11 with the energy of the spring 9a, accordingly. On the other hand, the shaft 10b of the reverse-drive pinch roller 10 is checked in its displacement by the cam face 6 of the changeover plate 4. The reverse-drive pinch roller 10 is kept away from the capstan 12, accordingly.

Figure 7:
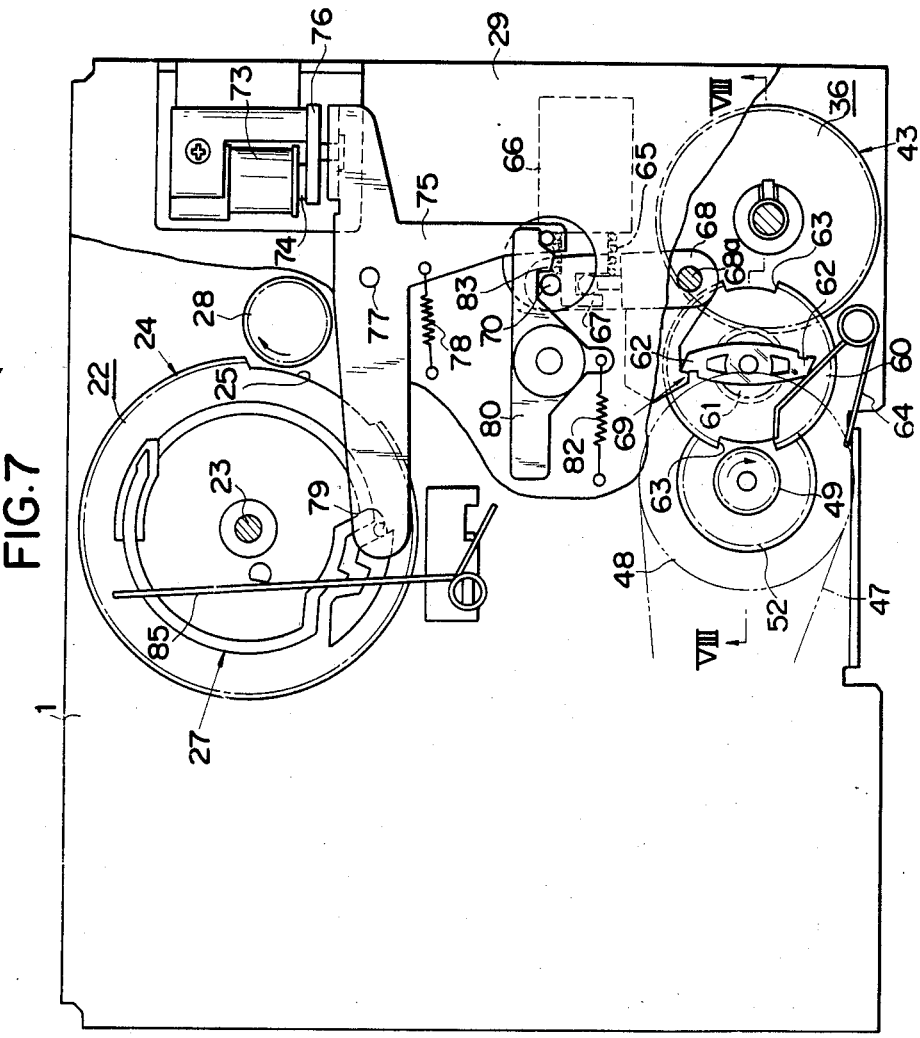
FIG. 7 is a back view taken in a direction opposite to that of the view of FIG. 6.
Figure 8:
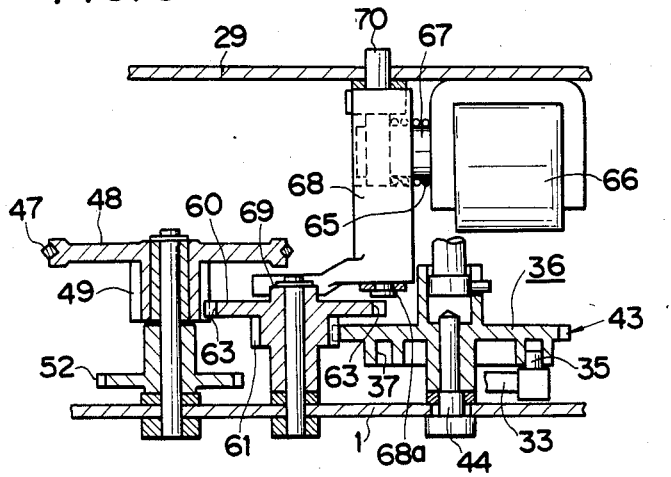
FIG. 8 is a cross-sectional view as sectioned along the line VIII—VIII of FIG. 7.

It will be understood from the positions of the pinch rollers 9 and 10 and from the rearmost position of the head plate 2 that FIGS. 1 through 3 show forward-drive playback mode. FIGS. 6 through 8 also show the forward-drive playback mode.

As shown in FIGS. 2 and 3, a power plate 16 is disposed between the head plate 2 and a mode plate 30. The power plate 16 is slidable back and forth relative to the chassis 1 in the same directions as the head plate 2. In the Figures, the power plate 16 is at the foremost position. One end of a drive arm 17 is rotatably affixed to the bottom face of the chassis 1 by a shaft 18. A spring member 20 is secured to the drive arm 17 to act on a pin 19 in response to rotation of the drive arm 17. The pin 19 is fixed to the power plate 16 and projects under the chassis 1 through an elongated hole (not shown) formed therein. The other free end of the drive arm 17 has a rod 21 which extends downward and engages a power cam 26 which will be described later, as shown in FIG. 3.

A base plate 29 is disposed in parallel with and distant enough from the chassis 1 to allow various components therebetween. A cam disk 22 is rotatably supported on the base plate 29 by an axle 23, as shown in FIG. 3. The cam disk 22 has a geared outer circumference 24 which is partly broken by a cutoff 25 for a reason which will be clarified later. The cam disk 22 has a power cam 26 formed on the top surface thereof as shown in FIG. 2 to engage the lower end of the rod 21 of the drive arm 17. With rotation of the cam disk 22, the drive arm 17 pivots under control of the power cam 26, and may or may not push the pin 19 of the power plate 16 via the spring member 20 to displace back and forth the power plate. The cam disk 22 also has a timing cam 27 formed on the bottom surface thereof to effect an operation which will be described later.

Figure 5:
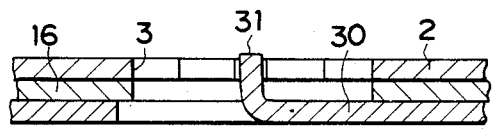
FIG. 5 is an enlarged cross-sectional view as sectioned along the line V—V line of FIG. 4.

A mode plate 30 is sandwiched by the chassis 1 and the power plate 16. The mode plate 30 is slidable not only back and forth together with the power plate 16 but also laterally alone. The mode plate 30 has a protuberance 31 projecting upward from a central portion thereof. The protuberance 31 passes through a hole formed in the power plate to allow free displacement thereof and engages the cam hole 3 of the head plate 2. As shown in FIGS. 4 and 5, the protuberance 31 takes positions opposed to step-in and stepout edges 3a through 3e of the cam hole 3 in a given order in response to the lateral displacement of the mode plate 30.

The mode plate 30 has therein an elongated hole 32 elongated back and forth. A link 33 consists of three separate members which are pivotably connected in series by pivot pins 38 and 39. The pivot pin 38 which is farthest from the mode plate 30 is fixed to the chassis 1 or any other member immovable with respect to the chassis 1 in order to support the link 33 on the chassis 1, whereas the pivot pin 39 which is closer to the mode plate 30 merely connects the two separate members of the link 33 and can freely change its position. One end of the link 33 which is nearest to the mode plate 30 has a pin 34 which engages the elongated hole 32 of the mode plate 30 whereas the other end which is remote from the mode plate 30 has a pin 35 which engages a mode cam 37 which will be described later.

Another cam disk 36 is rotatably fixed to the bottom face of the chassis 1 by a shaft 44, as shown in FIG. 6 which is seen a view from the same direction as FIG. 2 but with the chassis 1 being removed, in FIG. 7 which is a view from the bottom of FIG. 6, and in FIG. 8 which is a sectional view taken along the line VIII—VIII of FIG. 7. The cam disk 36 has a geared outer circumference 43 and a mode cam 37 formed on the top surface thereof as shown in FIGS. 2 and 6. The mode cam 37, power cam 25 and timing cam 27 have such profiles as to give the members engaging therewith displacements to and away from the rotation axles of the cam disks 22 and 36.

As shown in FIG. 1, another link 40 consists of two separate members which are pivotably connected in series by a pivot pin 40b, one of which is pivotably mounted on the chassis 1 by a pin 40a. One end of the link 40 is connected to the changeover plate 4 by a pin 41 whereas the other end which is farthest from the changeover plate 4 has a pin 42 which passes through the chassis 1 and engages the mode cam 37 under the chassis 1. The pin 42 and the pin 35 of the first link 33 engage the mode cam 37 with 120 degrees difference.

Hereinbelow is explained, mainly with reference to FIG. 6, how to drive cassette reel drive shafts 13 and 14, the capstans 11 and 12, and other cooperating members of FIGS. 1 and 2. Rotation of a drive shaft 46 of a motor 45 is transmitted to a pulley 48 by a belt 47. Rotation of the pulley 48 is reduced by transmission from a first gear 49 integral therewith to a larger second gear 50. The decelerated rotation is transmitted from a third gear 51 which is integral with the second gear 50 to a fourth gear 52 which has the same diameter as the third gear 51 and is concentric with the first gear 49. Rotation of the fourth gear 52 is transmitted to a gear 13a via an idler gear 53 which is located at the solid-line position in FIG. 6, and rotates the forward-drive cassette reel drive shaft 13.

As shown in FIG. 1, an arm 54 connected to an axle 53a of the idler gear 53 is pivotably supported on the chassis 1 by an axle 54a. The axle 53a of the idler gear 53 passes through an opening 84 of the head plate 2 above the chassis 1, and is located between a pair of protuberances 7 which are formed along the rear edge of the changeover plate 4. Thereby, the arm 54 supporting the idler gear 42 is rotated about the axle 54a by the axle 53a of the idler gear 54 in response to displacement of the protuberances 7 due to the displacement of the changeover plate 4 as described above.

Now assume that the idler gear 53 is moved by the rotation of the arm 54 from the solid-line position to the broken-line position in FIG. 6. Then the idler gear 53 does not transmit the rotation to the forward-drive cassette reel drive shaft 13, and instead transmits it to a gear 14a of a reverse-drive cassette reel drive shaft 14 from the third gear 51.

As shown in FIG. 6, the forward-drive and reverse-drive capstans 11 and 12 are elongated shafts of a pair of flywheels 71 and 72. The flywheels 71 and 72 (i.e. the capstans 11 and 12) are always driven in a given direction by the motor via a belt (not shown) engaging the drive shaft 46 of the motor 45. The flywheels 71 and 72 have geared circumferences 71a and 72a. A high speed idler gear 55 comprising a large gear 55a and a small gear 55b is interposed between the flywheels 71 and 72. The idler gear 55 is pivotably supported by an end of an arm 59 which is pivotably supported at the other end thereof to the chassis 1 by the axle 54a which also pivotably supports the arm 54 connected on the aforementioned idler gear 53. When the arm 59 rotates about the axle 54a from the illustrated neutral position to the right in the Figure (to the forward-drive flywheel 71), the large gear 55a engages the forward-drive flywheel gear 71a, and the small gear 55b concurrently engages a gear 13b which is provided on the bottom surface of the forward-drive cassette reel drive shaft 13. When the high speed idler gear 55 is biased to the left in the Figure (to the reverse-drive flywheel 72), the large gear 55a engages the reverse-drive flywheel gear 72a, and the small gear 55b engages a gear 14b which is formed on the bottom surface of the reverse-drive cassette reel drive shaft 14. Thus, with the rotation of the high speed idler gear 55, one of the cassette reel drive shafts 13 and 14 which is brought into linkage with the associated flywheel 71 or 72 by the idler gear 55 rotates at a high speed.

To effect the displacement of the high speed idler gear 55, a changeover member 56 is coupled to the axle of the idler gear 55. The changeover member 56 is supported on an axle 56a rotatably fixed to the bottom surface of the chassis 1. The changeover member 56 also has at the other end farthest from the idler gear 55 a pair of protuberances 57 which project above the chassis 1 through holes (not shown) formed in the chassis 1 so as not to prevent displacement of the protuberances 57. A spring 58 engages the axle 56a of the changeover member 56 to normally keep the changeover member 56 and the high speed idler gear 55 in the neutral positions of FIG. 6. Hereinbelow is explained, mainly with reference to FIGS. 7 and 8, how to drive the cam disks 22 and 36 having the power cam 26 and the mode cam 37 respectively. FIG. 7 is a view as seen from the back of FIG. 6, and FIG. 8 is a cross-sectional view taken along the line VIII—VIII of FIG. 7. An intermediary gear 60 is rotatably mounted between the cam disk 36 and the first gear 49 as shown in FIG. 6, too. The intermediary gear 60 engages the first gear 49 but has two symmetric cutoffs 63 breaking the geared circumference thereof to effect disengagement from the gear 49. A small gear 61 is intergrally combined with the intermediary gear 60 and always engages the geared circumference 43 of the cam disk 36. The intermediary gear 60 also has a pair of engagement members 62 each making a right angle with the cutoff 63. The intermediary gear 60 is biased by a spring 64 in the same direction as it will rotate due to engagement with the first gear 49.

As shown in FIG. 8, a mode solenoid 66 is fixed to the base plate 29 under the chassis 1 (above the chassis 1 in FIG. 8). An associated core 67 is pulled to the right in FIGS. 7 and 8 when the solenoid 66 is energized. A core arm 68 is also pivotably supported on the base plate 29 by an axle 68a, and is connected to the core 67 so as to be actuated thereby. The other end of the core arm 68 which is nearer to the chassis 1 has a hook 69 which engages the engagement members 62 of the intermediary gear 60 in the forward playback mode illustrated. More specifically, the hook 69 engages one of the engagement members 62 when the mode solenoid 66 is deenergized, and disengages from it when the solenoid 66 is energized.

As already stated above, the power cam 26 has the geared circumference 24 and the timing cam 27 formed at the lower end thereof opposite to the power cam 26, as shown in FIG. 7. The geared circumference 24 is partly broken by a cutoff 25. The gear 24 is engageable with a small drive gear 28 (FIG. 7) which is formed on the lower surface opposite to the capstan 11, but it disengages from the small drive gear 28 when the cutoff 25 faces it as illustrated.

A power solenoid 73 is also fixed to the base plate 29 to give a magnetic force to an associated core 74 upon energization. An operation arm 75 is pivotably supported on the base plate 29 by an axle 77. As shown in FIG. 7, the left end of the operation arm 75 has a pin 79 to engage the timing cam 27, and the right end of the operation arm 75 is connected to a core plate 76 which is attracted by the core 74 when the power solenoid 73 is energized. The core plate 76 is made from a magnetic material which promptly loses the residual magnetism.

Figure 9:
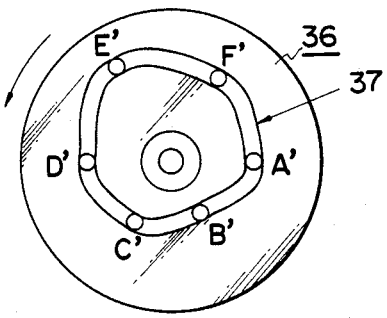
FIG. 9 shows an essential configuration of a mode cam.
Figure 10:
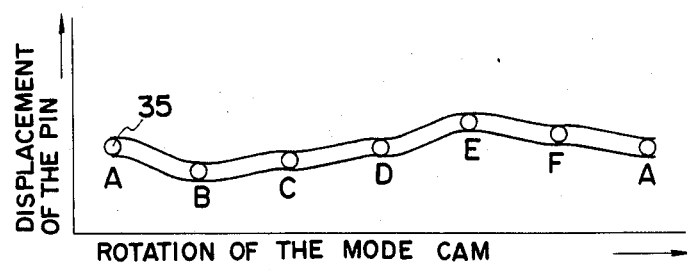
FIG. 10 is a graph showing displacement of a pin 35 in response to rotation of the mode cam.

Hereinbelow is described how the cassette tape reproducing apparatus selects various tape feeding modes. Assume now that the cam disk 36 having the mode cam 37 started to rotate in the arrow direction of FIG. 2 from the forward play mode illustrated. With this rotation, the pin 35 of the link 33 connected toward the mode plate 30 moves to and away from the axle 44 of the cam disk 36. As shown in FIGS. 9 and 10, the pin 35 moves from the position A', through positions B', C', D' and E', and to the position F'. The position A' is for the forward-drive playback mode, B' is for the rewinding mode, C' is for the cue signal detection in the rewinding mode, D' is for the reverse-drive playback mode, E' is for the fast-forwarding mode, and F' is for the cue signal detection in the fast-forwarding mode. Due to this displacement of the pin 35, the link 33 moves the mode plate 30 laterally in FIG. 2, as stated before. Referring now to FIG. 4, which shows the relation of the protuberance 31 of the mode plate 30 with respect to the cam hole 3 of the head plate 2, in response to displacement of the pin 35 through positions A', B', C' to D' of FIGS. 9 and 10, the protuberance 31 moves through positions A, B, C and D which are opposed to the steps 3a, 3c, 3b and 3a in the cam hole 3, respectively. When the pin 35 further moves through the positions D', E', F' and A', the protuberance 31 moves through positions D, E, F and A which are opposed to the steps 3a, 3e, 3d and 3a, respectively.

As stated before, the pin 42 of the link 40 connected to the changeover plate 4 engages the mode cam 37 at a position 120 degrees ahead of the pin 35 of the link 33 in the rotating direction of the cam 37. More specifically, when the pin 35 to actuate the mode plate 30 is at the position A' of FIGS. 9 and 10, the pin 42 is in the position E', and thereafter moves through F', A', B', C' and E' in response to the rotation of the mode cam 37. Due to this displacement of the pin 42, the link 40 moves the changeover plate 4 laterally in FIG. 1.

In the explanation given above about the displacements of the changeover plate 4 and the mode plate 30, it is assumed that the power plate 16 (including the mode plate 30) is in the foremost position (not shown) away from the illustrated rear most position for the forward-drive playback mode. When these members are in the foremost positions, the rod 21 of the drive arm 17 engaging the power cam 26 is in the position A shown by an imaginary line in FIG. 2. This means that when the rod 21 takes the position A, the cassette tape reproducing apparatus is in the stop mode, and the power cam 26 will start rotation from this mode.

When the power cam 26, i.e. the cam disk 22, starts rotating in the arrow direction in FIG. 2, the rod 21 gradually approaches the center of the cam disk 22 from the position A, following the configuration of the power cam 26. Due to this, the drive arm 17 also rotates and pushes rearward the power plate 16 and the mode plate 30 which were in the foremost positions. When the rod 21 takes the position B shown in FIG. 2 by a dotted line, the power plate 16 and the mode plate 30 reach the rearmost positions.

Now assume that the rotation of the mode cam 37 has displaced the mode plate 30 to put the protuberance 31 in the position A or D opposed to the step 3a in the cam hole 3 of the head plate 2 in FIG. 4. If the mode plate 30 moves rearward together with the power plate 16 in response to the rotation of the power cam 26, the head plate 2 is pushed rearwardly by the protuberance 31. Since the step 3a bulges out most toward the protuberance 31, the head plate 2 is pushed rearward by the longest distance, and the resulting disposition is just the playback mode of the tape player. Whether this playback mode is the forward-drive or the reverse-drive mode is determined by the changeover plate 4.

When the protuberance 31 is in the position B or E opposed to the step 4c or 4e of the cam hole which is secluded most from the protuberance 31, the head plate 2 is never pushed by the protuberance 31 irrespectively of the full rearward displacement thereof. This rearward displacement of the mode plate 30, however, selectively depresses one of the paired protuberances 57 (FIGS. 2 and 6) of the changeover member 56 for lateral displacement of the high speed idler gear 55. Due to this, the high speed idler gear 55 is biased from the neutral position illustrated in FIG. 6 to the left or to the right, and effects the linkage of the forward-drive cassette reel drive shaft 13 or the reverse-drive cassette reel drive shaft 14 to the associated flywheel 71 or 72 to drive the cassette reel drive shaft at a high speed. This is just the rewinding or the fast-forwarding mode.

When the protuberance 31 is in the position C or F opposed to the step 3b or 3d of the cam hole 3 which bulges out less than the step 3a toward the protuberance 31, the head plate 2 is pushed rearward by a smaller distance than in the playback mode by the rearward displacement of the mode plate 30. In this case also, the changeover member 56 is selectively biased by the mode plate 30 and moves the high speed idler gear 55 to the left or to the right so as to bring the forward-drive or reverse-drive cassette reel drive shaft 13 or 14 into engagement with the associated flywheel 71 or 72 to drive the cassette reel drive shaft at the high speed. This is just the cue signal detection mode in fast-forwarding or rewinding mode.

Due to lateral displacement of the changeover plate 4 caused by the rotation of the mode cam 37 in the forward-drive or reverse-drive playback mode, the pinch rollers 9 and 10 (FIG. 1) are selectively brought into forcible contact with the associated capstan 11 or 12 by the cam surface 5 or 6 of the changeover plate 4. In the other modes, however, the cam surfaces 5 and 6 of the changeover plate 4 keep the pinch rollers 9 and 10 away from the capstans 11 and 12. Along with the lateral displacement of the changeover plate 4, the paired protuberances 7 engageable with the axle 53a move the idler gear 53 to the position shown in FIG. 6 by the solid line in the forward playback mode, and to the position shown in the same Figure by the broken line in the reverse playback mode. In the other tape feeding modes, however, the idler gear 53 is kept between the illustrated two positions by the protuberances 7 so as not to transmit the rotation thereof to the reel drive shaft 13 nor 14.

Figure 11:
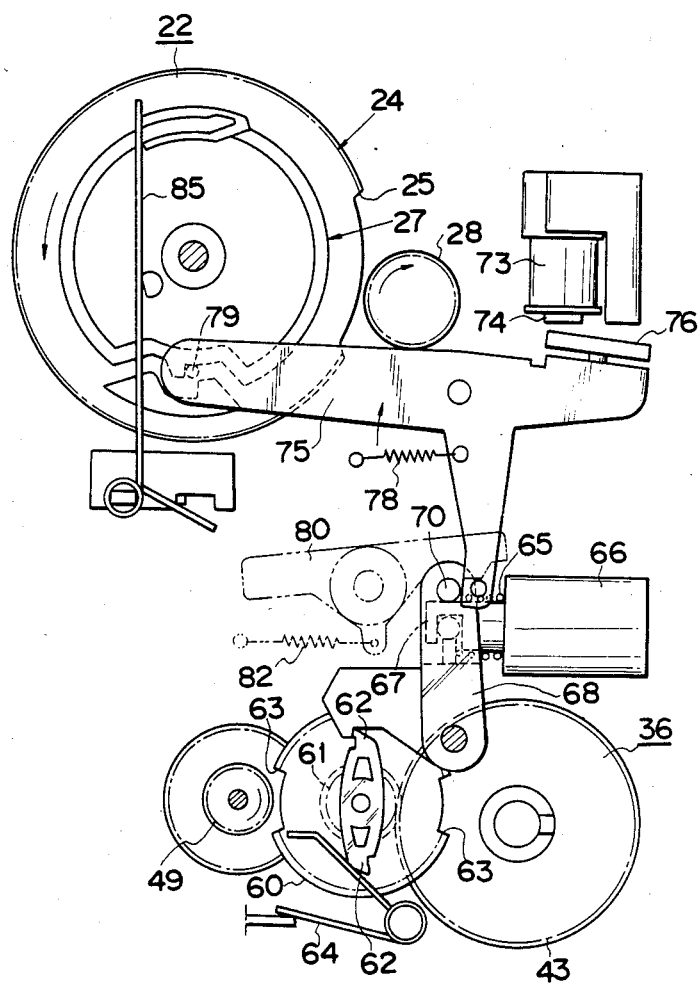
FIGS. 11 through 13 show various operational positions of members shown in FIG. 7.

Hereinbelow is explained how the mode cam 37 and the power cam 26 are controlled as to rotation thereof. Assume now that the cassette tape player is in the stop mode. The components shown in FIG. 7, which illustrates the forward-drive playback mode, take positions as shown in FIG. 11. For example, the power cam 26 takes the position to put the rod 21 of the drive arm 17 at the position A of FIG. 2.

Figure 12:
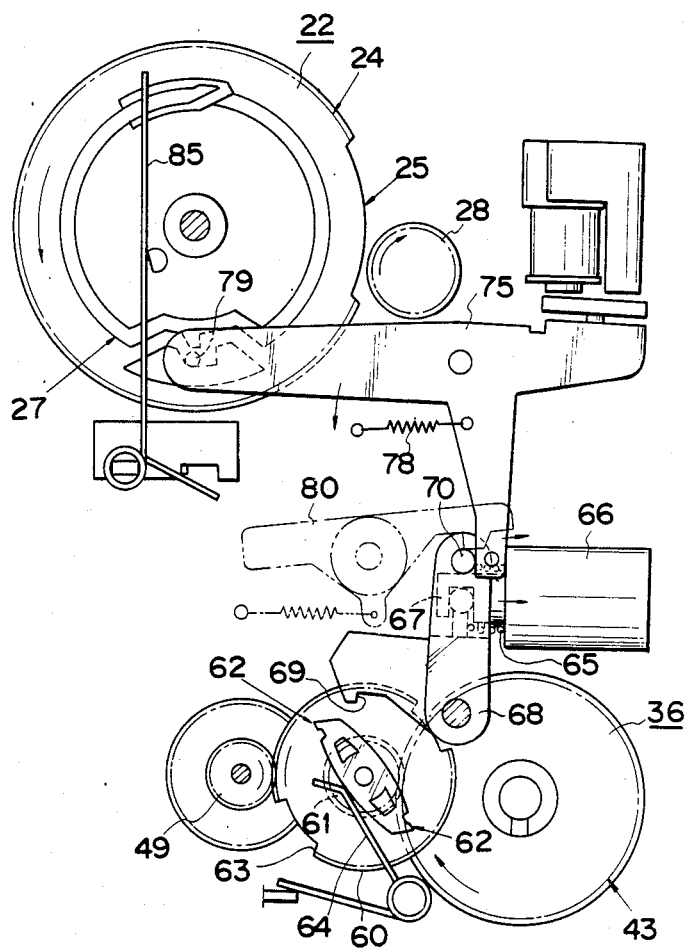

If a play mode button is manually depressed, the mode solenoid 66 is energized, and the core 67 rotates the core arm 68 to the position illustrated in FIG. 12. As the result, the hook 69 of the core arm 68, which engaged the engagement members 62 of the intermediary gear 60 so as to put the cutoff 63 in face of the first gear 49, disengages from the engagement members 62 and allows the intermediary gear 60 to rotate due to the spring 64 to engage the first gear 49. Thereafter, the intermediary gear 60 is continuously rotated by the first gear 49 and rotates the mode cam 37.

At the same time, due to the rotation of the core arm 68 as shown in FIG. 12, the pin 70 thereof pushes a part of the operation arm 75 to the right in the Figure. Due to this, the operation arm 75 is rotated in the arrow direction (in the counterclockwise direction) in FIG. 12 against the spring 78, so as to displace the pin 79 of the operation arm 75 away from the position illustrated in FIG. 11 wherein the pin 79 stops the rotation of the timing cam 27. Thereby, the timing cam 27 is rotated by the spring 85 to the position illustrated in FIG. 12.

When an order given by manual operation of the operation button coincides with the rotation angle of the continuously rotating mode cam 37, i.e. with the positions which the changeover plate 4 and the mode plate 30 take in response to the rotation angle of the mode cam 37, the mode solenoid 66 is deenergized. The core 67 is thereby forced out of the mode solenoid 66 by the energy of the coil spring 65, and rotates the core arm 68 to the original position shown in FIG. 13. The hook 69 of the core arm 68 engages one of the engagement members 62 of the intermediary gear 60, accordingly, so as to put the cutoff 63 in face with the first gear 49 again. Then, the rotation transmission from the first gear 49 to the mode cam 37 is interrupted.

Figure 13:
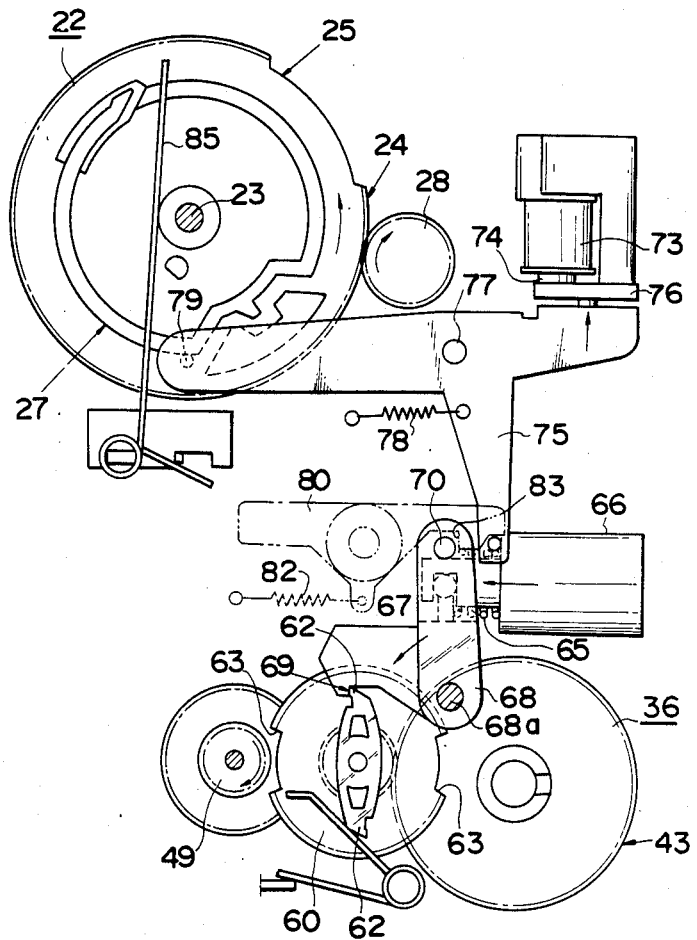

Concurrently with said operation, the rotation of the core arm 68 removes the pin 70 thereof from the operation arm 75, and allows it to rotate with the energy of the spring 78 in the arrow direction of FIG. 13 (in the clockwise direction) from the position of FIG. 12. Due to this, the pin 79 of the operation arm 75 displaces from the position of FIG. 12, which keeps the cam disk 22 unrotatable, toward the rotation axle of the cam disk 22 to allow it to rotate slightly with the energy of the spring 85, so that the geared circumference 24 of the cam disk 22 engages the drive gear 28 and starts rotating as shown in FIG. 13.

After the timing cam 27 (the power cam 26) starts rotating, the power solenoid 73 is energized. Due to this, the core 74 attracts the core plate 76 of the operation arm 75, and keeps the operation arm 75 unrotatable at the position of FIG. 13, for example, against the energy of the spring 78. In this state, if the timing cam 27 (power cam 26) continues rotating and reaches the position of FIG. 7, the cutoff 25 faces the drive gear 28 to interrupt the rotation transmission from the drive gear 28 to the timing cam 27. It should be noted that, at that time, the pin 70 of the operation arm 75 takes the position of FIG. 7 to keep the timing cam 27 at the illustrated position, and that the power cam 26 takes the position as shown in FIG. 2, and the rod 21 of the drive arm 17 takes the position B of FIG. 2. These aspects show that the desired tape feeding mode (forward-drive playback mode, for example) is created in response to the manual operation of the operation button.

Thereafter, when the playback is finished, a corresponding electric signal deenergizes the power solenoid 73. The operation arm 75 rotates due to the energy of the spring 78 from the position of FIG. 7 to the position of FIG. 11 again. Thus the cassette tape player is set in the stop mode.

During the mode selection as shown in FIG. 7, after the mode solenoid 66 is deenergized to interrupt the power transmission to the mode cam 37 as shown in FIG. 13, the core arm 68 is kept unrotatable by engagement of the pin 70 thereof with a hook 83 of a mis-operation prevention arm 80 which is mounted on the base plate 29 and is biased by the spring 82. As the result, even if the mode solenoid 66 is energized in the state as shown in FIG. 13 or 7, the core arm 68 and the intermediary gear 60 are reliably kept in the illustrated positions so as to never rotate the mode cam 37 imprudently.

As described above, since the present invention is arranged to create various tape feeding modes by employment of only one motor to drive both the mode cam and the power cam, and also by employment of only two solenoids to control their rotations, it greatly contributes to a reduction in overall size and production cost of the tape player.

The embodiment of the invention in which an exlusive property or privilege is claimed is defined as follows:

1. A mode switching mechanism for a cassette tape recorder, comprising:
   a drive motor;
   a changeover plate and means supporting said changeover plate for reciprocal movement parallel to a first direction, said changeover plate being movable to first and second positions;
   tape transport means for selectively drivingly coupling said drive motor to a tape cassette in said cassette tape player so as to effect movement of a tape therein in one of two directions which are opposite in response to movement of said changeover plate to said first and second positions, respectively;
   a power plate and means supporting said power plate for movement parallel to a second direction different from said first direction;
   a mode plate and means supporting said mode plate for reciprocal movement parallel to said second direction synchronously with said power plate, and for reciprocal movement parallel to said first direction independently of said power plate between several positions which correspond to respective operational modes of said cassette tape recorder;
   a rotatably supported mode cam;
   first means for selectively drivingly coupling said motor to said mode cam for effecting rotation of said mode cam;
   second means responsive to movement of said mode cam for moving said changeover plate and said mode plate to positions thereof corresponding to a selected operational mode;
   a rotatably supported power cam;
   third means for selectively drivingly coupling said drive motor to said power cam so as to effect rotation of said power cam and for interrupting said driving coupling from said motor to said power cam after said power cam has been rotated through a predetermined angle; and
   fourth means responsive to rotation of said power cam through said predetermined angle for moving said power plate and said mode plate through a predetermined stroke in said second direction;
   wherein said first means includes a mode solenoid which, when energized, allows said mode cam to rotate and, when deenergized, stops rotation of said mode cam; and
   wherein said third means includes a pivotally-supported operation arm and a power solenoid, said operation arm normally being in a first position in which it holds said power cam against rotation but being moved in response to said mode solenoid being deenergized to a position in which it allows said power cam to be rotated, said power solenoid being energized after rotation of said power cam begins and holding said operation arm in a second position, said power solenoid being deenergized when the mode switching operation is complete to allow said operation arm to return to said first position in which it holds said power cam against rotation.

2. A mode switching mechanism for a tape player which has a plurality of manually selectable operational modes and which can removably receive a tape pack having an elongate magnetic tape supported for lengthwise movement therein, comprising: a drive motor; a mode cam and means supporting said mode cam for movement to a plurality of unique positions which each correspond to a respective one of said operational modes of said tape player; a mode member and means supporting said mode member for reciprocal movement parallel to a first direction of movement between first and second positions and for reciprocal movement parallel to a second direction of movement between different positions which each correspond to at least one of said operational modes, said second direction of movement extending transversely of said first direction of movement; a changeover member and means supporting said changeover member for movement to plural positions which each correspond to at least one of said operational modes; cam follower means responsive to said mode cam and operationally coupled to said mode member and said changeover member for effecting, in response to movement of said mode cam, movement of said mode member parallel to said second direction and movement of said changeover member; means for drivingly coupling said drive motor to said mode cam in response to manual selection of one of said operational modes so as to effect movement of said mode cam and thus said mode and changeover members to the positions thereof corresponding to said selected operational mode, and for thereafter causing said drive motor to effect movement of said mode member in said first direction of movement from said first to said second position thereof; means responsive to said changeover member for causing said drive motor to be drivingly coupled to a tape in a tape pack in a manner effecting movement of the tape at a first speed when said changeover member is in a position corresponding to one of said operational modes in which the tape must be moved at said first speed; and means responsive to movement of said mode member to said second position when said mode member is in a transverse position corresponding to an operational mode in which the tape must be moved at a second speed substantially faster than said first speed for causing said drive motor to be drivingly coupled to the tape in a manner effecting movement of the tape at said second speed.

3. The mode switching mechanism according to claim 2, wherein said means movably supporting said mode cam includes a mode cam member which has said mode cam thereon and is supported for rotation about an axis, and wherein said different positions of said mode cam corresponding to respective operational modes of said tape player are each a respective and unique angular position of said mode cam.

4. The mode switching mechanism according to claim 3, wherein said cam follower means includes separate first and second linkage mechanisms which are each operationally coupled to a respective one of said mode member and said changeover member and which each have a respective cam follower element slidably engaging said mode cam.

5. The mode switching mechanism according to claim 4, wherein said mode cam is an elongate endless groove which is provided in said mode cam member and which extends around said axis of rotation of said mode cam member, wherein each said cam follower element is a pin which has an end slidably received in said groove in said mode cam member, wherein said groove causes said pins to move in directions radially of said axis of rotation of said mode cam member in response to rotation of said mode cam member, and wherein said pins engage said groove at locations which are spaced from each other about said axis of rotation of said mode cam member by a predetermined angular distance.

6. The mode switching mechanism according to claim 3, wherein said means for drivingly coupling said drive motor to said mode cam includes a rotatably supported intermediary gear which has gear teeth drivingly engaging gear teeth provided on said mode cam member and which has two engagement members fixedly secured thereto and extending radially outwardly in opposite directions with respect to an axis of rotation thereof, a pivotally supported lever, selectively actuable solenoid controlled means for effecting movement of said lever between positions in which it is respectively engaging and free of engagement with one of said engagement members on said intermediary gear, said lever preventing rotation of said intermediary gear when operationally engaged with one of said engagement members thereon, and means for causing said drive motor to effect rotation of said intermediary gear when said lever is in said position free of engagement with said engagement members on said intermediary gear.

7. The mode switching mechanism according to claim 2, wherein said means movably supporting said mode member includes a power member supported for reciprocal movement parallel to said first direction and includes said mode member being supported on said power member for reciprocal movement relative to said power member parallel to said second direction, and wherein said means for causing said drive motor to effect movement of said mode member includes means selectively cooperable with said power member for causing said drive motor to effect movement of said power member in said first direction, said mode member moving parallel to said first direction simultaneously with said power member.

8. The mode switching mechanism according to claim 7, wherein said means for effecting movement of said power member includes a rotatably supported power cam member having a power cam thereon, means for selectively effecting and preventing rotation of said power cam member by said drive motor, and power cam follower means cooperable with said power cam and said power member for effecting movement of said power member in said first direction in response to rotation of said power cam member.

9. The mode switching mechanism according to claim 8, wherein said power cam follower means includes a pivotally supported power arm having a pin thereon which slidably engages said power cam, rotation of said power cam causing said pin to move in a manner effecting pivotal movement of said power arm, and a torsion spring element supported on said power arm and engageable with a pin provided on said power member, pivotal movement of said power arm causing said spring element to move said power member in said first direction.

10. The mode switching mechanism according to claim 9, wherein said means for effecting and preventing rotation of said power cam member includes a further cam provided on said power cam member, a pivotally supported operation arm engageable with said further cam on said power cam member and movable between positions respectively permitting and obstructing pivotal movement of said power cam member, and selectively actuable solenoid means for effecting movement of said operation arm between said positions thereof.

11. The mode switching mechanism according to claim 7, including a head plate supported for reciprocal movement parallel to said first direction and having thereon a tape head, reciprocal movement of said head plate parallel to said first direction causing said tape head to move between positions engaging and spaced from a tape in a tape pack in the tape player, and wherein said mode member has thereon a protuberance which, in at least one position of said mode member relative to said power member and in response to movement of said mode and power members in said first direction, is engageable with a surface on said head plate so as to effect movement of said head plate in said first direction.

12. The mode switching mechanism according to claim 4, wherein said surface on said head plate is stepped and has respective step portions which each face in a direction opposite said first direction, adjacent said step portions being offset from each other in said first direction and in said second direction, and said protuberance on said mode member being aligned with one of said step portions of said surface on said head plate in each said position of said mode member relative to said power member.

13. The mode switching mechanism according to claim 4, wherein said means responsive to movement of said mode member for effecting movement of said tape at said second speed includes an idler gear rotatably supported on an idler gear support which in turn is supported for movement between positions in which said idler gear is facilitating a driving coupling between said drive motor and a respective one of first and second rotatably supported reel bases, includes spaced protuberances provided on said idler gear support, and includes said mode member having two portions which can each engage a respective one of said protuberances on said idler gear support, said mode member being movable parallel to said second direction between respective said operational positions thereof in which a respective one of said portions thereof is aligned with a respective one of said protuberances on said idler gear support, subsequent movement of said mode member in said first direction by said power member causing such portion of said mode member to engage said protuberance aligned therewith and to effect movement of said idler gear support to one of said positions in which said idler gear is facilitating a driving coupling between said drive motor and a respective said reel base.

14. The mode switching mechanism according to claim 2, wherein said means responsive to movement of said changeover member for effecting movement of a tape at said first speed includes two spaced, rotatably supported capstans, two pinch roller support members each having a pinch roller rotatably supported thereon and means supporting each said pinch roller support member for movement between positions in which the pinch roller thereon is engaging and spaced from a respective one of said capstans, a tape in a tape pack extending between each said pinch roller and the associated capstan, resilient means yieldably urging movement of each said support member in a direction corresponding to movement of said pinch roller thereon toward the associated capstan, and cam surface means provided on said changeover member and cooperable with each said pinch roller support member for effecting movement of said pinch roller support member in a direction away from the associated capstan against the urging of said resilient means in response to movement of said changeover member parallel to said second direction.

15. The mode switching mechanism according to claim 14, including an idler gear support having thereon an axle and an idler gear rotatably supported on said axle, and means supporting said idler gear support for movement between two positions in which said idler gear is facilitating a driving coupling between said motor and a respective one of two rotatably supported reel bases, and including said changeover member having spaced projections thereon which are disposed on opposite sides of said axle of said idler gear and, in response to movement of said changeover member, effect movement of said idler gear support and said idler gear between said positions in which said idler gear facilitates a driving coupling between said drive motor and a respective one of said reel bases.

16. The mode switching mechanism according to claim 2, wherein said operational modes of said tape player include a forward play mode, a reverse play mode, a fast forward mode, a rewind mode, a fast forward cue mode and a rewind cue mode, and wherein said mode member is movable parallel to said second direction between five operational positions, the centermost of said operational positions of said mode member corresponding to said forward play mode and said reverse play mode, the outermost of said operational positions of said mode member respectively corresponding to said fast forward mode and said rewind mode, a position of said mode member between its centermost position and its outermost position for fast forward mode corresponding to said fast forward cue mode, and a position of said mode member between its centermost position and its outermost position for rewind mode corresponding to said rewind cue mode.

* * * * *

UNITED STATES PATENT AND TRADEMARK OFFICE
CERTIFICATE OF CORRECTION

PATENT NO. : 4 674 001
DATED : June 16, 1987
INVENTOR(S) : Akira TAKAHASHI et al It is certified that error appears in the above-identified patent and that said Letters Patent is hereby corrected as shown below:

Column 12, line 43; change "claim 4" to ---claim 11---.

Column 12, line 53; change "claim 4" to ---claim 11---.

Signed and Sealed this

Tenth Day of November, 1987

Attest:

DONALD J. QUIGG

Attesting Officer

Commissioner of Patents and Trademarks